United States Patent Office 2,745,728
Patented May 15, 1956

2,745,728

GRINDING WHEELS AND METHOD OF MAKING THEM

Ernest P. Irany, Worcester, Mass., assignor to Norton Company, Worcester, Mass., a corporation of Massachusetts No Drawing. Application July 30, 1952, Serial No. 301,798

3 Claims. (Cl. 51—298)

The invention relates to grinding wheels and a method of making them.

One object of the invention is to provide active sulphur in a phenolic resin bonded grinding wheel. Another object of the invention is to improve the quality of resinoid bonded grinding wheels. Another object of the invention is to prevent sulphur incorporated in a phenol formaldehyde mix from reacting therewith during curing.

Other objects will be in part obviously or in part pointed out hereinafter.

Except for the particular step and procedure which is the subject matter of the present invention, I make phenolic resin bonded grinding wheels in the regular or usual way now well known to those skilled in the art and already described in many patents. One preferred way of making such grinding wheels is to take a quantity of abrasive grain, to wet it with a compatible liquid such as liquid A stage phenol formaldehyde or, on the other hand, furfural, then to add a quantity of reactive phenol formaldehyde resin in powdered form containing usually some hexamethylenetetramine, such as a reactive resin sold under the brand BR2417, then thoroughly stirring the wet abrasive grains with the powdered resin thus to coat each separate granule with a quantity of the powder wetted by the furfural or the liquid resin as the case may be, then taking a quantity of the mix thus produced and molding it to some predetermined size in a steel mold by the use of an hydraulic press, thereafter stripping the pressed wheel from the mold and finally baking it in an oven at a temperature of the order of 175° C. for a few hours, thereby polymerizing the resin causing the methylene groups to cross-link the phenol groups thus making a strong resinous polymer holding and bonding the individual grains together into the form of a grinding wheel which turns out to be stronger than a vitrified bonded grinding wheel, capable of more abuse, capable of being rotated at a higher speed as measured in surface feet per minute than the well known vitrified bonded grinding wheel, and phenolic resin bonded grinding wheels thus made being especially desired in steel mills for the grinding of billets, snagging of castings and many other uses where strength and ruggedness are characteristics especially desired.

In accordance with the invention I coat particles of sulphur with any substance which will not deleteriously react with the phenol formaldehyde bond during the maturing thereof. Sulphur itself, raw and uncoated, does react deleteriously with the phenol formaldehyde resin, weakening it.

I can use a very little or a great deal of sulphur. The grinding wheel will not be weakened by the coated sulphur if there is no more than 50% by weight of sulphur, on the total sulphur, bond, and coating on the sulphur. So far as grinding efficiency is concerned, the more sulphur there is in the wheel the better it grinds, and therefore the invention contemplates up to 50% sulphur defined as above.

*Example I*

A porous silicious brick (specific gravity 0.74, porosity about 67 volume percent) was crushed to grains of from 10 to 18 grit size. Seventy parts by weight of the crushed brick and seventy parts by weight of sulphur were heated above the melting point of the sulphur whereupon the brick grains absorbed the sulphur. These grains were then mixed with polytetrafluoroethylene emulsion of water, thus coating the sulphur filled grain. The coated grains were then dried to drive off the water and a quantity of the coated grains was incorporated into a grinding wheel mix for the manufacture of a phenol formaldehyde bonded grinding wheel in the standard way. The resultant wheel which in this case had about 20% of raw sulphur therein by weight of the total sulphur, brick grains, and bond was strong and was more efficient in grinding than the usual phenol formaldehyde bonded wheel containing cryolite as a filler.

*Example II*

Five pounds of sulphur was thoroughly mixed with 20 cubic centimeters of furfural in a Hobart mixer. Then one pound of reactive phenol formaldehyde resin of the brand BR2417 was added to the furfural wetted sulphur and thoroughly mixed therewith. This mixture was then screened through a 30 mesh screen. The resultant mix was baked for 12 hours at 105° C., rescreened through the 30 mesh screen and was used to make wheels. Several wheels were made, one with 20% by weight of sulphur on the total sulphur coating and bond, one with 25% by weight of sulphur on the same, one with 35% and one with 45% by weight of sulphur on the same. All of these wheels were strong and had superior grinding characteristics, the one with the 45% of sulphur being the best.

An endless variety of substances can be used to coat the sulphur to keep it from reacting with the phenolic resin during curing. As further examples I can use shellac, aniline formaldehyde resin, rubber, guttapercha, butadiene styrene, butadiene acrylic nitrile, sodium silicate, glue with a little formaldehyde therein. Some of these substances themselves react with sulphur but if used in small quantity this is no detriment. For instance rubber, guttapercha, butadiene styrene and butadiene acrylic nitrile each of them is vulcanized by sulphur and heat (and in every case I heat the mixture to cure the coating) but if a large amount of sulphur and a small amount of rubber or other substance is used, the vulcanization makes a good coating leaving a large surplusage of sulphur on the inside.

It will thus be seen that there has been provided by this invention a process for the manufacture of grinding wheels in accordance with which the various objects hereinabove set forth together with many thoroughly practical advantages are successfully achieved. As many possible embodiments may be made of the above invention and as many changes might be made in the embodiment above set forth, it is to be understood that all matter herein above set forth is to be interpreted as illustrative and not in a limiting sense.

I claim:

1. A process of making a phenol-formaldehyde bonded gringing wheel which comprises forming on sulphur particles a substantially continuous coating of a film forming substance in a state in which said substance is non-reactive to phenol-formaldehyde resins during the curing thereof, mixing the coated sulphur with abrasive grains and a reactive phenol-formaldehyde resin, molding a grinding wheel from the resultant mix, and curing the mix with heat to form a grinding wheel having good bond strength containing sulphur due to prevention of the deterioration, during said curing, of the resin bond by means of the non-reactive coating on the sulphur particles.

2. A process according to claim 1, in which the amount of sulphur is limited to not more than 50% by weight of the total combined weight of sulphur, resin and non-reactive coating substance.

3. An abrasive article comprising abrasive grains and sulphur particles bonded in a cured phenol-formaldehyde resin, said sulphur particles being coated with a substantially continuous coating of a film forming substance which is in a state which is non-reactive to phenol-formaldehyde resin during the curing thereof, the amount of sulphur being between 20% and 50% by weight of the total combined weight of sulphur, resin and coating substance, the cured phenol-formaldehyde resin having substantially normal bond strength by the prevention of the deterioration thereof by the sulphur due to the non-reactive coating substance covering the sulphur particles.

References Cited in the file of this patent

UNITED STATES PATENTS

| | | |
|---|---|---|
| 1,977,748 | Webster | Oct. 23, 1934 |
| 2,114,636 | Nelson | April 19, 1938 |
| 2,308,981 | Kistler | Jan. 19, 1943 |
| 2,334,526 | Allison | Nov. 6, 1943 |

FOREIGN PATENTS

| | | |
|---|---|---|
| 583,471 | Great Britain | Dec. 19, 1946 |